INVENTOR.
John G. Pace

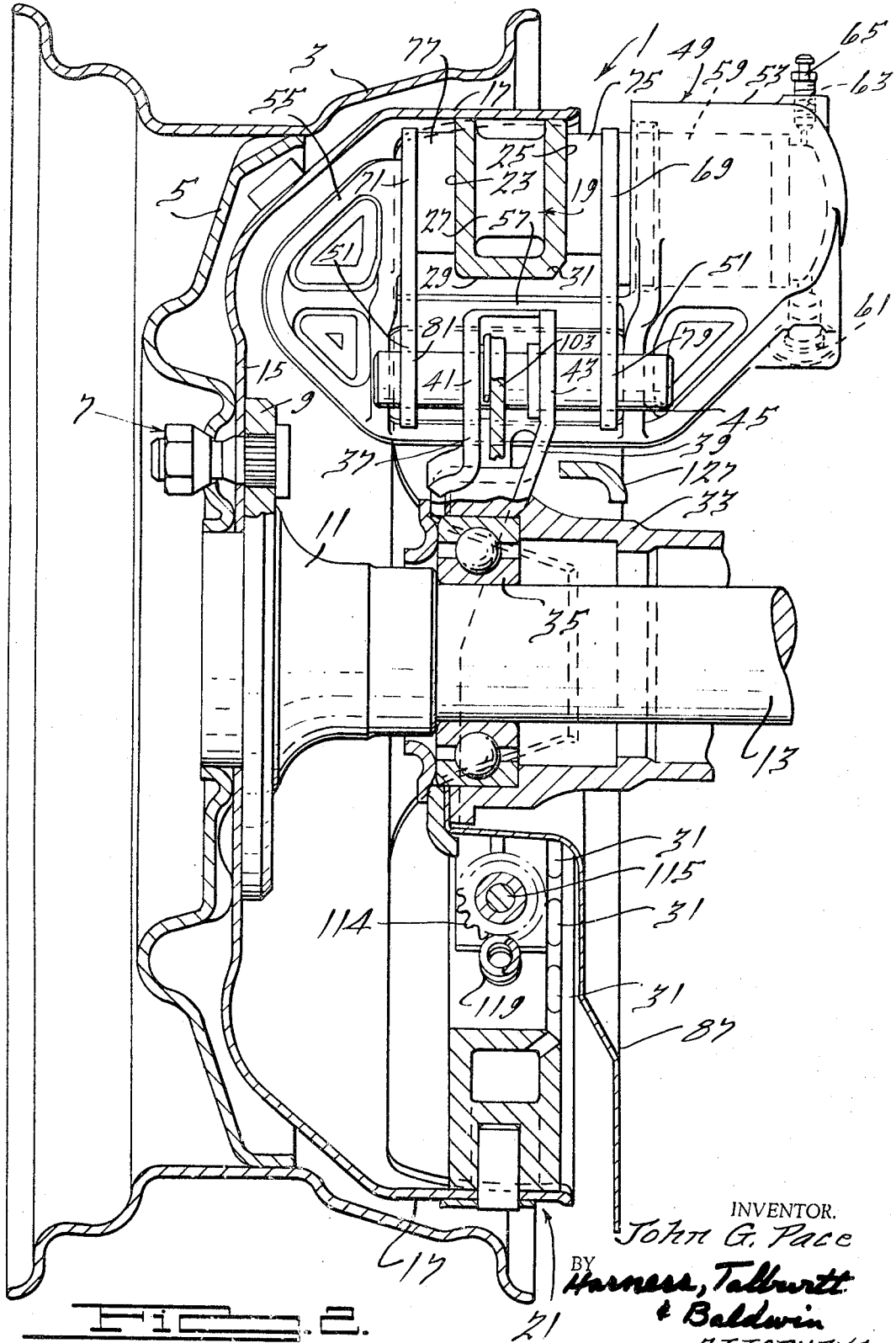

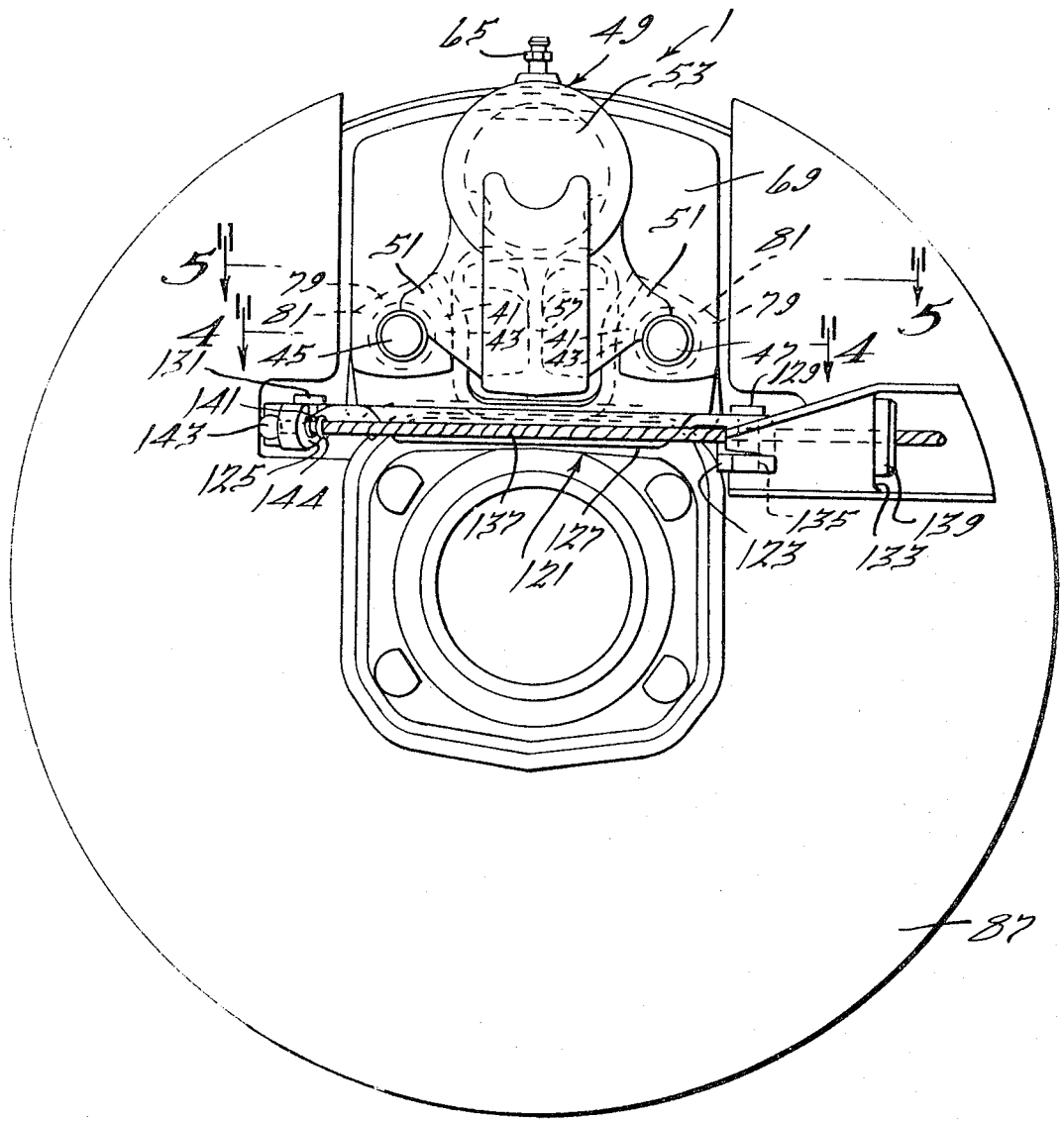

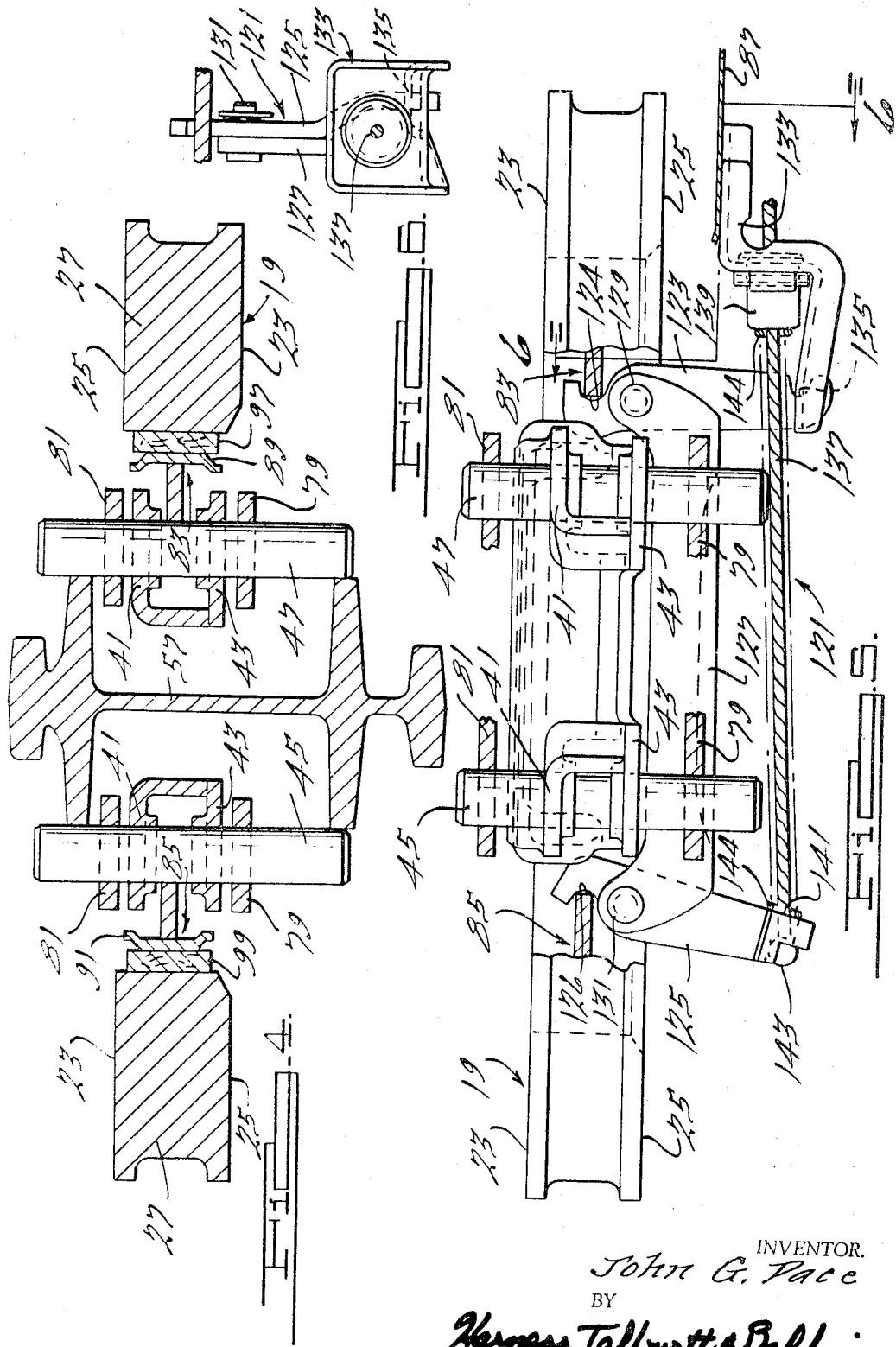

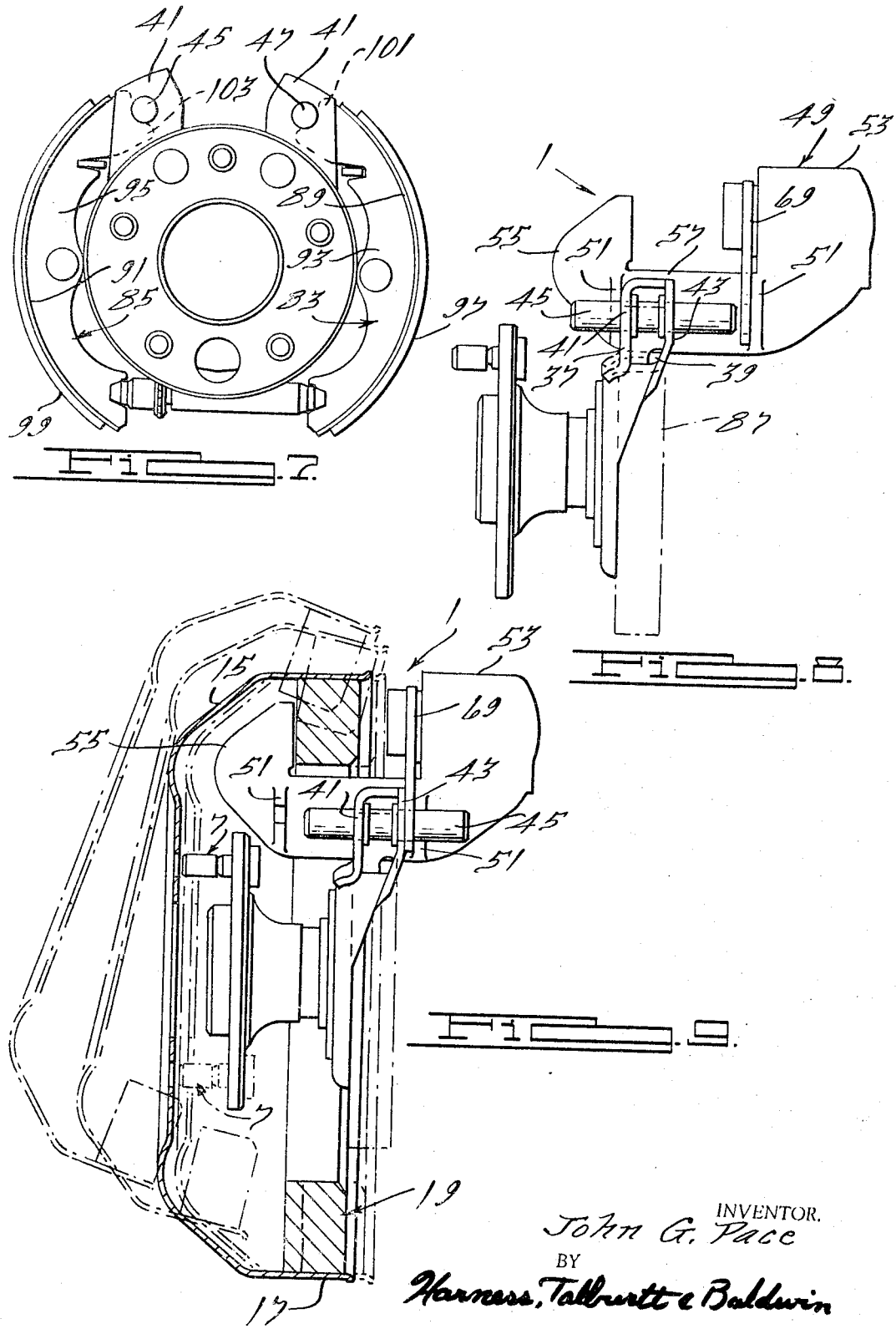

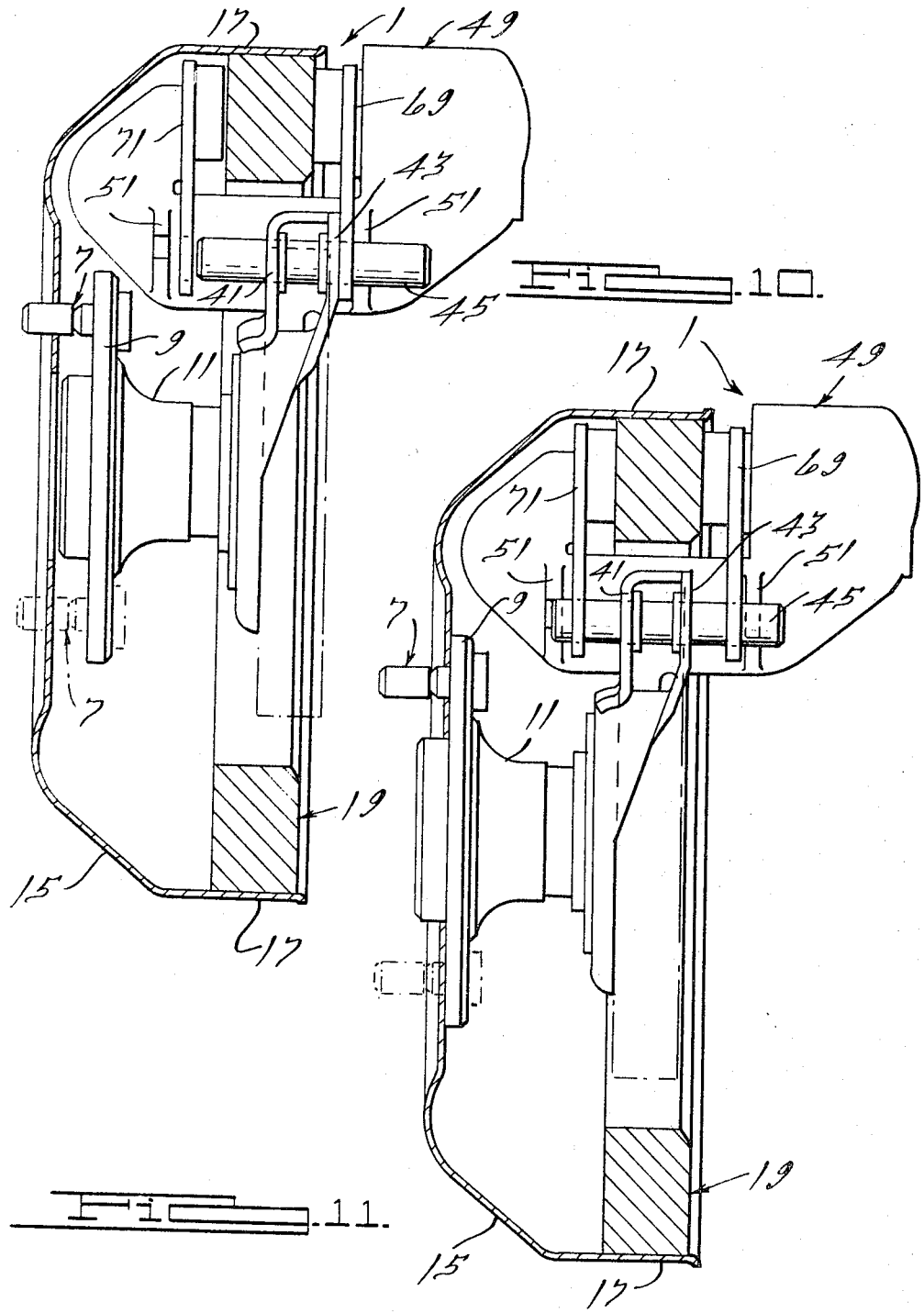

United States Patent Office 3,447,646
Patented June 3, 1969

3,447,646
DISC BRAKE APPARATUS
John G. Pace, Detroit, Mich., assignor to Chrysler Corporation, Highland Park, Mich., a corporation of Delaware
Filed Dec. 5, 1966, Ser. No. 599,302
Int. Cl. F16d 65/14, 63/00, 55/00
U.S. Cl. 188—106     7 Claims

ABSTRACT OF THE DISCLOSURE

This disclosure relates to a disc brake for automotive vehicles and disclosures a rotatable annulus, a body internally straddling the annulus and mounted for sliding movement axially relative to the annulus, the body including a hydraulically actuated piston for forcing shoes into clamping engagement with the sides of the disc, and duo-servo arcuate shoes connected for manually actuated engagement with the internal annular peripheral surface of the disc.

Background of the invention

This invention relates to brakes for vehicles, and more particularly to a fluid actuated disc brake having a manually operated hand brake adapted to engage the disc.

It has been proposed in the prior art to provide an independent mechanically operated brake which operatively engages the outer or inner peripheral surface of the disc of a fluid actuated disc brake structure. Such structures usually included a disc brake having two or more pistons located on opposite sides of a rotatable disc. The pistons were hydraulically actuated to force brake linings into engagement with the disc. The housing structure for the two or more pistons took up a considerable amount of space. The hand brake actuating mechanism in these structures, was, due partly to the space requirements of the disc brake mechanism, usually located on the side of the wheel axle opposite the disc brake mechanism diametrically across from the latter or substantially radially inwardly of the disc brake mechanism, thereby requiring additional support parts for the hand brake.

Summary of the invention

The present invention includes a disc brake mechanism having only one piston for forcing the brake linings into contact with the disc, the housing surrounding the piston being in the form of a caliper which slides axially relative to a support for forcing one of the brake linings into contact with the disc. The hand brake actuating mechanism is adjacent the disc brake mechanism and the shoes actuated by such hand operated mechanism are in the same plane as the disc. The disc brake caliper is slidably mounted on the anchor pins against which the hand brake shoes react.

One of the primary objects of this invention is to provide a fluid actuated caliper type disc brake having a manually operated hand brake which engages the inner periphery of the disc and reacts on the same pins on which the caliper of the disc brake slides.

Another object of the present invention is to provide a disc brake having a hand brake, such as described, which is adapted to be equally effective against forward and reverse movement of the vehicle.

A further object of this invention is to provide a disc brake and hand brake apparatus of the class described wherein the hand brake is operated by a novel device adapted to apply equal forces on the adjacent ends of a pair of duo-servo brake shoes.

Still another object of the present invention is to provide a disc brake and hand brake apparatus of the type described which in one embodiment is constructed to permit air circulation through the disc while the hand brake shoes engage the inner periphery of the disc.

Another object of the present invention is to provide a disc brake and hand brake apparatus which is compact and may be easily assembled and installed.

A further object of this invention is to provide a disc brake and hand brake apparatus such as described which is economical in construction and reliable in operation.

Other objects and features of this invention will become apparent as the description progresses.

Description of the drawings

In the accompanying drawings, in which one of various possible embodiments of this invention is illustrated:

FIG. 2 is a vertical section taken through the center of FIG. 1, with the wheel with which the apparatus is associated being shown;

FIG. 3 is an elevation view of the apparatus shown in FIG. 1, taken from the inner side of the wheel;

FIG. 4 is an enlarged section taken along line 4—4 of FIG. 3, certain parts being removed for clarity;

FIG. 5 is a section taken generally along line 5—5 of FIG. 3, certain parts being removed for clarity;

FIG. 6 is a section taken along line 6—6 of FIG. 5;

FIG. 7 is a side elevation of the brake shoe apparatus forming a part of the hand brake; and FIGS. 8, 9, 10 and 11 are end elevational views of the apparatus of this invention, illustrating several sequential steps during assembly, certain parts being omitted for clarity.

Like parts are indicated by corresponding parts throughout the several views of the drawings.

Description of the preferred embodiment

Figure 1:
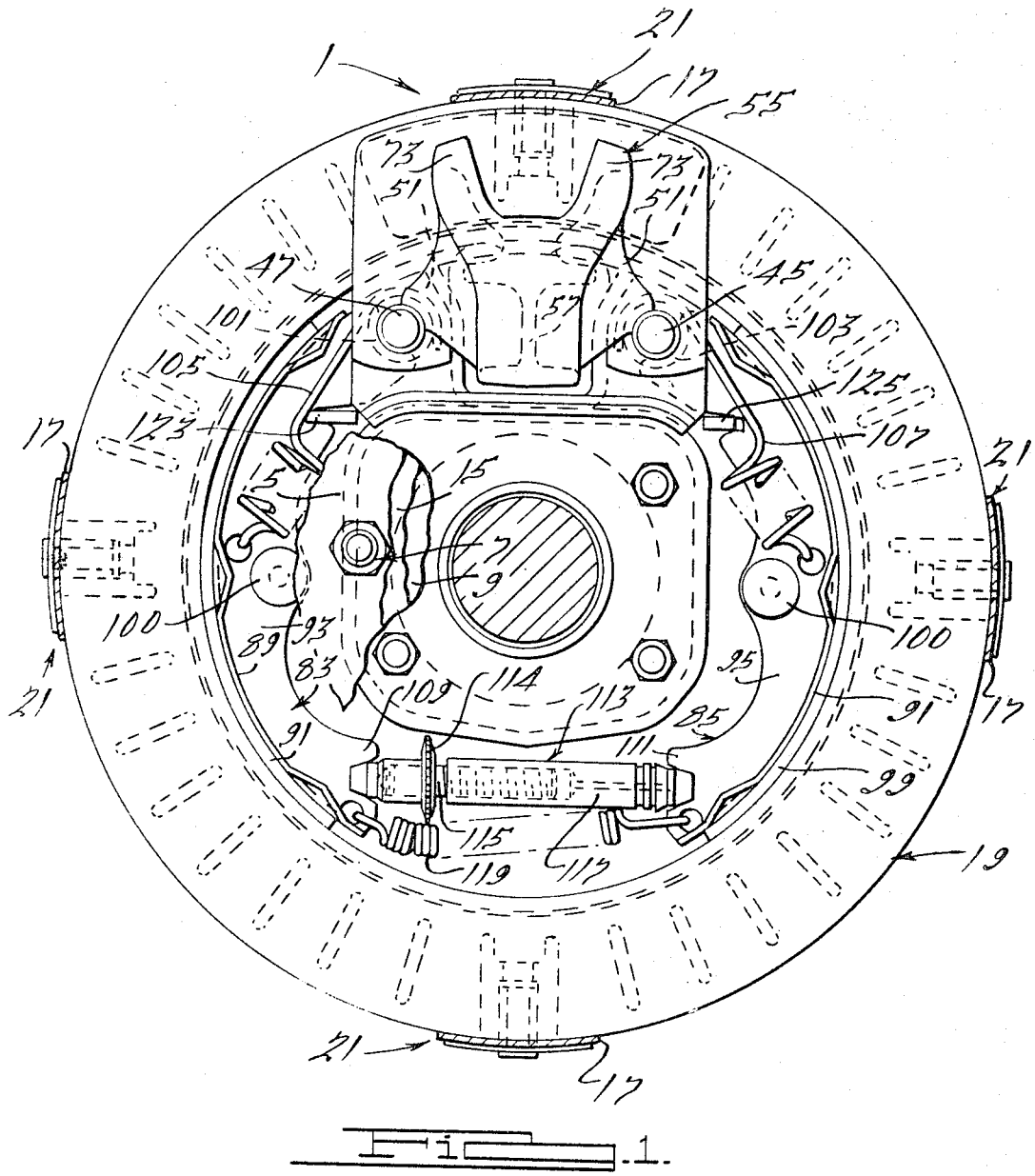
FIG. 1 is an elevational view of a disc brake and hand brake apparatus, constructed in accordance with this invention, mounted on a wheel, certain parts being broken away and removed for clarity.

Referring now to the drawings, a disc brake of this invention is generally indicated at 1. The brake is associated with a vehicle wheel (FIG. 2) having a rim 3 and a wheel body 5 secured by bolt and nut assemblies 7 to a flange 9 of a hub 11 located on the end of a driven axle 13. It is to be assumed, for the purposes of this description, that the disc brake of this invention is mounted on a rear wheel of a vehicle.

A disc support 15 is also secured to flange 9 of hub 11 by bolt and nut assemblies 7. Support 15 is generally saucer-shaped and has four fingers 17 equally spaced around the circumference of the support. A ring-shaped disc or annulus 19 is connected to fingers 17 by clamping plate and pin assemblies 21. Disc 19 comprises two side walls 23 and 25 separated by a plurality of webs 27 and a relatively wide internal annular wall 29. A plurality of vents 31 connect the spaces between webs 27 to the atmosphere outside the disc so that air may be circulated through the disc for carrying away heat generated in the disc.

A relatively fixed force receiving member or forging 33 surrounds the axle 13 and is connected to hub 11 by a bearing 35. Attached to forging 33 are support plates 37 and 39 having outwardly extending fingers 41 and 43, respectively (see FIGS. 2–5). As will be seen in FIGS. 2, 4 and 5, fingers 41 and 43 are located substantially the same distance inwardly, in an axial direction, from the adjacent sides of the disc 19. Two force receiving or support pins 45 and 47 have a press fit in holes in fingers 41 and 43 and extend outwardly from opposite sides of the fingers.

A floating caliper body or yoke-shaped member 49 (see FIG. 2) is provided with four shoulders 51, two on each side of the body, which are in sliding contact with pins 45 and 47. Caliper 49 is in the form of a C-shaped casting having a cylinder or jaw portion 53 located on one side of disc 19 and a backing or jaw portion 55 on the other side of the disc. The portions 53 and 55 are connected together by a web portion 57 which passes inside the disc as shown in FIGS. 2 and 4.

Power means is provided in the form of a piston 59 reciprocably mounted in cylinder portion 53 for movement toward and away from the disc 19. Cylinder portion 53 has a fluid inlet 61 through which fluid under pressure is delivered to supply the power force for the piston. A conventional bleed aperture 63 and fitting 65 are provided in cylinder 53 for bleeding air from the fluid system.

Piston 59 contacts a brake shoe or plate 69 for urging the latter toward disc 19. Shoe 69 is one of a pair of shoes or plates 69 and 71 which are located on opposite sides of disc 19. Shoe 71 is located between a pair of fingers 73 (FIG. 1) formed on backing portion 55. Each shoe is identical and may be made on the same stamping die. Linings 75 and 77 are attached to the shoes 69 and 71, respectively, between the shoes and disc 19.

The shoes 69 and 71 have two leg portions 79 and 81, respectively, depending from the inner end thereof. The leg portions have holes therein extending axially relative to the wheel axis, and are mounted on the force receiving pins 45 and 47 for sliding movement toward and away from disc 19. Thus, caliper 49 and shoes 69 and 71 are adapted to slide relative to one another on pins 45 and 47.

As mentioned previously, the internal annular wall 29 of disc 19 is relatively wide. This wall functions as the drum against which duo-servo arcuate brake shoes 83 and 85 are adapted to be mechanically forced. Shoes 83 and 85 are supported by axially extending rim portions 89 and 91, respectively, on a backing plate 87 secured to forging 33. The brake shoes 83 and 85 have their rim portions 89 and 91 provided with central radially extending webs 93 and 95, respectively, so that the brake shoe structures are in the form of T-shaped elements having generally arcuate contours adapted to fit inside the axially extending annular wall 29 of disc 19. Shoe 83 has a brake lining 97 on the outer side thereof while shoe 85 has a similar lining 99 thereon. Pin and spring assemblies 100 pivotally connect webs 93 and 95 to the backing plate 87.

The upper ends 101 and 103 of shoes 83 and 85, as viewed in FIGS. 1 and 7, engage the pins 47 and 45, respectively, and are biased toward such engaged portions by springs 105 and 107 extending between web 93 of shoe 83 and pin 47 and between web 95 of shoe 85 and pin 45. The opposite ends 109 and 111 of the shoes 83 and 35 engage an adjusting strut 113 which includes a threaded member 115 in threaded engagement with a cylindrical member 117. Manual rotation of an adjusting wheel 114 attached to member 115 in one direction effects extension of the adjusting strut 113 for moving the shoes 83 and 85 closer to annular wall 29 as the shoe linings 97 and 99 wear. A spring 119 extends between brake shoe end portions 109 and 111 for maintaining the latter in engagement with strut 113.

The shoes 83 and 85 are adapted to be moved outwardly into engagement with the annular wall 29 of disc 19 by an actuating mechanism generally indicated at 121 in FIGS. 3, 5 and 6. It includes two levers 123 and 125 engaging the notches 124 and 126, respectively, in brake shoes 83 and 85. Levers 123 and 125 are connected together by a link 127 pivotally connected to the levers by pins 129 and 131. A generally S-shaped bracket 133 secured to backing plate 87 has a notch 135 (FIGS. 3 and 5) in its outer end in which the outer end of lever 123 is received. A cable or wire 137, one end of which is connected to a manual actuated tensioning device (not shown), extends through a guide 139 in bracket 133 and a slot 141 formed by the inturned outer end of lever 125. Cable 137 has a bead or enlarged member 143 on its free end to prevent withdrawal of the cable through slot 141.

A compression spring 144 surrounds cable 137 between lever 125 and guide 139 for maintaining the outer end of lever 125 and bead 143 in contact with one another. The shoes 83 and 85 and levers 123 and 125 are normally held in the positions shown in FIGS. 1 and 5 by springs 105 and 107. However, when sufficient force is applied to cable 37 to overcome the force of springs 105 and 107, lever 125 is swung counterclockwise as viewed in FIG. 5 about the pin 131. Since lever 125 engages the notch 126 of shoe 85, link 127 moves to the right forcing lever 123 to pivot clockwise about notch 135. As the linings 97 and 99 engage the annular interior wall 29 of disc 19, the braking forces exerted by the linings are substantially equal to one another due to the force transmitting link 127 which connects levers 123 and 125. Thus, relatively positive and equal braking action is attained on opposite portions of the disc 19.

Installation of the disc brake apparatus of this invention is easily accomplished as follows:

First referring to FIGS. 7 and 8, pins 45 and 47 are positioned in the fingers 41 and 43 of support plates 37 and 39, and the brake shoes 83 and 85 connected so that the ends 101 and 103 bear on the pins. Next, the caliper 49 is placed so that the left-hand shoulders (as viewed in FIG. 8) ride on the pins. The disc shoe 69 is then slipped on the pins 45 and 47 and the caliper 45 is moved to the position shown in FIG. 9. The disc 19 and support 15 are next moved into the position illustrated in FIG. 9 with the support being slipped into bolts 7. Shoe 71 is then positioned adjacent pins 45 and 47 as shown in FIG. 10. The final step in the assembly merely involves moving the disc support 15, caliper 49, and shoes 69 and 71 from the positions shown in FIG. 10 to the positions shown in FIG. 11, and securing the disc support 15 to the flange 9 of hub 11.

Operation of the disc brake apparatus is as follows:

When pressure is applied to the brake pedal (not shown) in the vehicle fluid under pressure is admitted to the cylinder 53 through inlet 61. Piston 59 is moved outwardly of the cylinder toward disc 19 and shoe lining 75 is moved into contact with the wall 25 of the disc. At substantially the same time, due to the slight friction of shoe 69 on the pins 45, and 47, and engagement of lining 75 with disc wall 25, the pressure of the fluid in cylinder 53 reacts against the inner end of the piston to move the caliper to the right as viewed in FIG. 2. As the caliper moves in this direction brake shoe 71 is moved toward disc 19 and shoe lining 77 is moved into contact with wall 23 of dic 19.

As the linings 75 and 77 are moved into contact with the opposite side walls 25 and 23 of disc 19, the caliper 49 moves slightly to the right as viewed in FIG. 2 and the shoes 69 and 71 move closer together on pins 45 and 47. Thus, the caliper 49 and shoes 69 and 71 freely float on the pins. The force of the torque created by the engagement of the brake linings 75 and 77 is transferred through the shoes 69 and 71 to the pins 45 and 47. None of the torque is absorbed by the caliper 49 per se. Since the connections between the pins 45 and 47 and the shoes 69 and 71, which transmit the torque produced forces to the pins, are substantially equidistant from the sides of the disc, the movements produced on pins 45 and 47 are substantially equal and opposite to one another. Hence there is little or no tendency on the part of the shoes or caliper to twist. Accordingly, there is substantially no tendency to produce uneven brake lining wear. Heat generated by the friction between the linings and the disc is carried away by air floating between webs 27 and through vents 19 in the disc. When the brake pedal (not shown) is released, the inherent resiliency of the linings tends to move the shoes away from the disc.

The hand brake is operated by tensioning the cable 33. This causes the levers 123 and 125 to apply substantially equal forces against the shoes 83 and 85, respectively.

The shoes are thus forced outwardly causing linings 97 and 99 to engage the annular wall 29 of disc 19. It will be noted that the ends 101 and 103 normally ride on pins 45 and 47 between fingers 41 and 43 of support plates 37 and 39 (see FIG. 2). When the hand brake is actuated the ends 101 and 103 are moved slightly away from the pins 45 and 47, but return to such pins under the influence of springs 105 and 107 when the tension on cable 137 is released.

If the wheel is rotating or tends to rotate in a clockwise direction as viewed in FIG. 1 when the hand brake is operated, the shoes 83 and 85 will rotate with the wheel until the end 101 of shoe 83 engages pin 47, at which time the braking action will occur. Conversely, if the wheel rotates in a reverse direction, braking will be effected when the end 103 of the shoe 85 engages pin 45.

It will be seen that the caliper type disc brake and the manually operated hand brake are compact in construction and function effectively by applying a braking force to the rotatable annular disc. Both the caliper and its associated brake shoes and the hand brake shoes are adapted to ride on or engage the force taking pins 45 and 47, thus utilizing the pins for at least two functions. The construction of disc 19 not only permits rapid heat dissipation, but also provides a relatively wide annular wall or drum against the hand operated brake shoes 83 and 85 are forced, thus providing an effective hand braking system.

In view of the foregoing, it will be seen that the several objects and other advantages of the invention will be apparent.

I claim:

1. Disc brake apparatus for a vehicle wheel comprising disc member rotatable in a plane and having side walls, an annular wall connected to said side walls at the inner edges thereof, a relatively stationary force receiving member, a body straddling said disc member and having jaw portions on opposite sides of said disc member, disc member engaging members on opposite sides of said disc member and between said jaw portions, support means on which said body and said disc member engaging members are mounted for sliding movement, power means for moving said disc member engaging members into contact with opposite side walls of said disc member, a pair of brake shoes, means movably mounting said brake shoes on said force taking member, actuating means for moving said shoes into contact with said annular wall, said actuating means including first and second levers extending away from the plane in which said disc is rotatable, one end of each of said levers engaging a different shoe on the same side of the axis of rotation of the vehicle wheel as said body, a link pivotally connected to each of said levers and extending generally parallel to the plane in which said disc is rotatable, means connected to said force receiving member and engaging the other end of said first lever, and means for applying a force to the other end of said second lever to cause said levers to move said shoes into contact with said annular wall.

2. Disc brake apparatus as set forth in claim 1 including adjustable means extending between the other ends of said shoes for moving said shoes toward said annular wall.

3. Disc brake apparatus as set forth in claim 1 wherein said power means comprises a piston in one of said jaw portions, said piston being adapted to move out of said one jaw portion for moving one of said disc members engaging members toward said disc member, and means for admitting fluid into said one jaw portion behind said piston to move the latter out of said one jaw portion toward said disc member, said body moving in a direction opposite to the movement of said piston when fluid is admitted to said one jaw portion for moving the other disc engaging member toward said disc member.

4. Disc brake apparatus for a vehicle wheel comprising a rotatable disc member having side walls, a plurality of webs spaced apart from one another and separating said side walls, and annular wall joining said side walls at the inner edges thereof, a relatively stationary force receiving member, a generally yoke-shaped member straddling said disc member and having jaw portions on opposite sides of said disc member, disc member engaging members on opposite sides of said disc member and between said jaw portions, support pins on which said yoke-shaped member and said disc member engaging members are mounted for sliding movement, power means for moving said disc member engaging members into contact with opposite side walls of said disc member, a pair of arcuate brake shoes, means mounting said arcuate brake shoes on said force taking member adjacent said annular wall, one end of each of said arcuate shoes normally engaging said support pins, and actuating means located on the same side of the axis of said rotatable disc member as said yoke-shaped member for moving said arcuate shoes away from said support pins into contact with said annular wall.

5. Disc brake apparatus as set forth in claim 4, wherein said actuating means includes first and second levers extending away from said disc in a generally axial direction, one end of each of said levers engaging a different arcuate shoe, a link extending between and pivotally connected to each of said levers, said link being located radially inwardly from said support pins, means connected to said force receiving member and engaging the other end of said first lever, and means for applying a force to the other end of said second lever to cause said levers to move said arcuate shoes away from said support means into contact with said annular wall.

6. Disc brake apparatus as set forth in claim 5 including adjustable means extending between the other ends of said arcuate shoes for moving said arcuate shoes toward said annular wall.

7. Disc brake apparatus as set forth in claim 5 wherein said power means comprises a piston in one of said jaw portions, said piston being adapted to move out of said one jaw portion for moving one of said disc members engaging members toward said disc member, and means for admitting fluid into said one jaw portion toward said disc member, said yoke-shaped member moving in a direction opposite to the movement of said piston when fluid is admitted to said one jaw portion for moving the other disc engaging member toward said disc member.

References Cited

UNITED STATES PATENTS

| | | |
|---|---|---|
| 2,918,146 | 12/1959 | Cornillaud. |
| 3,122,221 | 2/1964 | Von Rucker _____ 188—70 X |
| 3,213,969 | 10/1965 | Rosanowski et al. ____ 188—73 |
| 3,194,350 | 7/1965 | Soltis _____ 188—73 |

FOREIGN PATENTS

| | | |
|---|---|---|
| 1,360,825 | 4/1964 | France. |

DUANE A. REGER, *Primary Examiner.*

U.S. Cl. X.R.

188—70, 73